– –

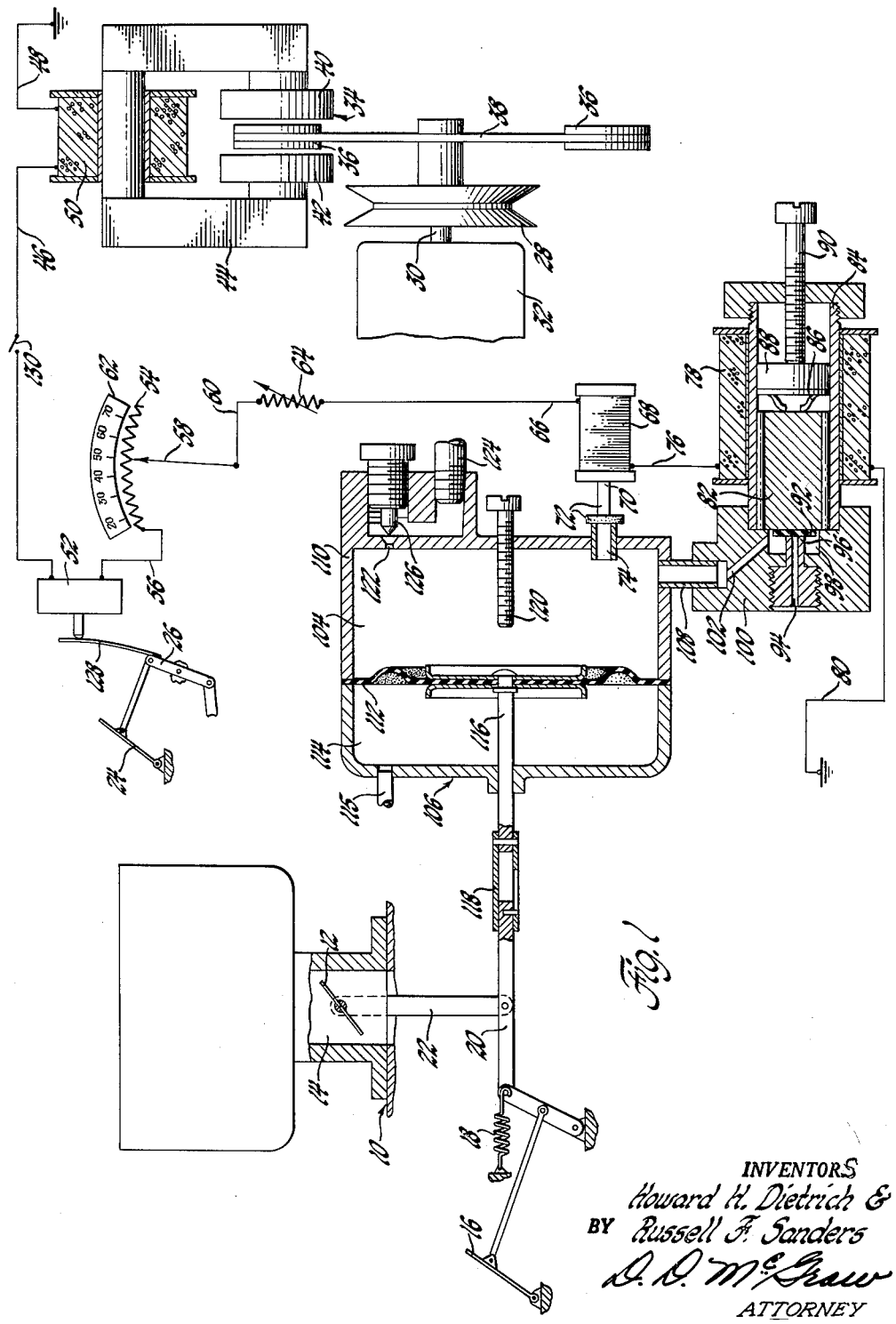

United States Patent Office 3,062,312
Patented Nov. 6, 1962

3,062,312
TURNPIKE THROTTLE CONTROL
Howard H. Dietrich and Russell F. Sanders, Rochester, N.Y., assignors to General Motors Corporation, Detroit, Mich., a corporation of Delaware
Filed Dec. 21, 1960, Ser. No. 77,377
2 Claims. (Cl. 180—82.1)

The invention relates to a control system for internal combustion engines and, more particularly, to a system which will control the engine throttles for maintaining a vehicle powered by the engine at a constant road speed.

Numerous systems have been proposed for controlling the speed of a vehicle so as to maintain a vehicle speed at a desired setting. Some of these systems give good results but are complicated so that the system cost is increased. A system embodying the invention operates to provide the essential features of a speed control mechanism at a minimum cost. The system also maintains the vehicle speed at a value close to the desired speed at all times under varying power requirements within the capabilities of the vehicle power plant. An electrical signal is generated which is proportional to the speed being controlled and is then modified to provide an electrical speed error signal commensurate with the difference between the actual speed and the desired speed. This signal controls a servo which is attached to the engine throttle or other fuel control mechanism to increase or decrease the engine speed and bring the controlled speed to the desired speed. Control is effected by the use of a modulating solenoid assembly responsive to the speed error signal. Safety features incorporated into the system include devices rendering the system inoperative when the vehicle brake is applied and permitting manual override of the system when a greater vehicle speed is required.

In the drawing:

The FIGURE is a schematic illustration of a system embodying the invention, with parts broken away and in section.

A vehicle having the system installed may be powered by an engine 10 controlled by a throttle 12 in the air intake passage 14 of the engine carburetor. If some other type of fuel system, such as a fuel injection system, is used, the system may be arranged to control that type of unit. The vehicle will be provided with the usual accelerator pedal 16 having a throttle return spring 18 and throttle linkage 20 and 22 connected to the throttle 12 and providing control of the throttle by the pedal 16. The vehicle is also provided with a brake pedal 24 acting through suitable brake linkage 26 to actuate the vehicle brakes when depressed.

The system may sense either engine speed or vehicle speed and is illustrated in the drawing as sensing engine speed through the generator drive pulley 28 and the generator shaft 30 which is normally provided to drive the vehicle generator 32. When a manual type transmission is used in a vehicle, therefore giving a positive drive relation between the engine and the vehicle wheels, engine speed is sufficiently related to vehicle speed to permit its use in the system. If a fluid type automatic transmission is used, it is preferable to sense vehicle speed through a portion of the power train beyond the fluid drive. Therefore, it is within the scope of the invention to consider shaft 30 as being driven at a speed bearing a definite relation to the vehicle speed whether it be driven from the engine or from another portion of the power drive train.

An electrical signal generating unit 34 is driven by the shaft 30 and generates an electrical signal in the system control circuit which is proportional to the speed of shaft 30. This may be accomplished by providing metal lugs 36 on a plate 38 attached to shaft 30 and positioned to pass between the poles 40 and 42 of the permanent magnet 44 when shaft 30 is rotated to generate an electrical signal in the circuit containing leads 46 and 48, which are connected with coil 50. Coil 50 is wound about permanent magnet 44 for this purpose. The electrical signal from coil 50 passes through lead 46 and a normally closed switch 52 to an adjustable resistance element 54 through lead 56. Contact arm 58 is arcuately adjustable to provide any suitable amount of electrical resistance in the circuit between lead 56 and arm 58 so that the electrical signal passing from arm 58 to lead 60 is modified. The amount of resistance introduced by element 54 is proportional to the desired vehicle speed, as is diagrammatically indicated by the dial 62 which is shown for schematic purposes in direct relation to resistance element 54. Lead 60 may have a second adjustable resistance element 64 therein which is provided to permit a factory setting which need not be changed after the system is calibrated. Lead 66 connects element 64 to the solenoid or electromagnet 68 which has a core 70 attached to a valve 72 controlling fluid passage 74 for purposes to be described. Lead 76 from solenoid 68 is connected to solenoid or electromagnet 78, which in turn is connected by lead 80 to ground, thus completing the circuit to lead 48.

Core 82 of solenoid 78 is slidably received in housing 84 and is movable therein against spring 86 when the solenoid 78 is energized. Spring 86 is mounted on spring support 88, also slidably received in housing 84, and positioned by stop screw 90 so that core 82 has one end engaged by spring 86 whether or not the solenoid is energized. A valve 92 is provided on the end of core 82 opposite spring 86 to control the atmospheric pressure air intake orifice 94. When the solenoid 78 is deenergized, spring 86 holds valve 92 against the valve seat 96 so that orifice 94 is closed. The orifice is opened by movement of core 82 to the right when solenoid 78 is energized to permit a controlled amount of atmospheric air to enter valve chamber 98 in valve housing 100. Solenoid 78 provides a modulating action of valve 92 since the position of core 82 and, therefore, valve 92 in relation to valve seat 96 is determined by the strength of the speed error signal through lead 76. The stronger the speed error signal, the greater is the solenoid force acting on the core 82 and resisted by spring 86 to further open orifice 94. Therefore core 82 is movable in continuous infinite incremental movements to various positions depending on the strength of the speed error signal.

Chamber 98 is provided with a passage 102 connected to chamber 104 of a servo 106 through conduit 108. Servo 106 includes a housing 110 having a diaphragm 112 dividing the housing into chambers 104 and 114. Chamber 114 is always subject to atmospheric pressure through vent 115. Diaphragm rod 116 extends through chamber 114 and is connected through lost motion link 118 to accelerator link 20 so that the throttle 12 is actuated by movement of diaphragm 112 toward the throttle opening direction against the force of throttle return spring 18. A suitable stop 120 may be provided to prevent diaphragm 112 from moving throttle 12 beyond a predetermined desired opening which may be full throttle or slightly less than full throttle.

A preset manifold vacuum bleed orifice 122 is provided in housing 110 to connect chamber 104 to the engine manifold through conduit 124. A needle valve 126 may be provided to permit the presetting of orifice 122 for calibration purposes. Fluid passage 74, earlier noted, connects with chamber 104 and provides a chamber dump so that, when valve 72 is opened by the deenergization of solenoid 68, atmospheric pressure is immediately admitted to chamber 104, thus moving diaphragm 112 to the left and permitting the throttle return spring 18 to return throttle 12 to the zero throttle position or other position as dictated by the accelerator pedal 16. Solenoid 68 is normally energized so long as there is any electrical current flowing through leads 66 and 76 and holds valve 72 in the closed position in relation to passage 74. Solenoid 68 is deenergized when switch 52 is opened through action of the brake pedal 24 and switch-actuating spring 128. Spring 128 is so positioned in relation to brake pedal 24 that it opens switch 52 as soon as the brake pedal is depressed a small amount. The speed control system is thus deenergized and rendered inoperative when the brake pedal is actuated. A similar switch may be provided in series wtih switch 52 and actuated by the vehicle clutch pedal when a manual transmission is used. A system-engaging switch 130, which may be manually opened and closed by the vehicle operator, may be provided somewhere in the control circuit and is illustrated as being positioned in lead 46.

In order to actuate the system, switch 130 is closed and arm 58 is positioned to the desired speed at which the vehicle is to be operated. As the vehicle approaches this speed, the electrical signal in lead 46 increases in relation to the actual speed. The portion of the signal passing through resistance 54 to arm 58 represents the speed error and a calibrated value of this signal represents zero speed error. This calibrated value is obtained by adjustment of resistance 64 during calibration of the system. The speed error signal thus actuates solenoid 68 to close valve 72 and act on core 82 of solenoid 78. When the speed error signal approaches its zero speed error value, it has so affected solenoid core 82 as to provide sufficient atmospheric air pressure through orifice 94 to chamber 104 so as to position diaphragm 112 and control throttle 12 to maintain the set vehicle speed. If the error signal affecting solenoid 78 drops below the zero speed error value, atmospheric air passing through orifice 94 is decreased, thereby permitting the pressure to further decrease in chamber 104 under influence of manifold vacuum through orifice 122, and further opening throttle 12. The speed error signal is then increased to its zero value by an increase in speed of shaft 30 resulting from the greater throttle opening until orifice 94 is again balanced. When the speed error signal is greater than its zero speed error value, core 82 moves further to the right against spring 86, further opening orifice 94 to admit more air under atmospheric pressure to chamber 104, thus permitting throttle return spring 18 to act against diaphragm 112 and to close throttle 12 until the speed error signal is decreased to its zero speed error value. A constant speed of shaft 30 is, therefore, maintained and, since this shaft is so connected as to be a function of vehicle speed, the speed of the vehicle is maintained at the set value.

We claim:
1. A vehicle speed control system comprising an electric signal generator driven at a speed responsive to vehicle speed and generating an electric signal proportional thereto, a circuit receiving said speed proportional signal, means for interrupting said circuit, variable resistance means in said circuit and providing a resistance therein proportional to a desired vehicle speed, first and second electromagnets in series in said circuit, first and second valves respectively controlled by said electromagnets, servo means for controlling vehicle speed and having said valves connected thereto, one of said electromagnets modulating the valve controlled thereby to control said servo to maintain said vehicle speed constant, and the other of said electromagnets opening the valve controlled thereby when deenergized to render said servo inoperable when said circuit interrupting means is actuated.

2. A vehicle speed control system comprising an electric signal generator driven at a speed responsive to vehicle speed and generating an electric signal proportional thereto, a circuit receiving said speed proportional signal, means for interrupting said circuit, first variable resistance means in said circuit and providing a resistance therein proportional to a desired vehicle speed, second variable resistance means in said circuit for calibrating said circuit to a zero speed error value, first and second electromagnets in series in said circuit, first and second valves respectively controlled by said electromagnets, servo means for controlling vehicle speed and having said valves connected thereto, one of said electromagnets modulating the valve controlled thereby to control said servo to maintain said vehicle speed constant, and the other of said electromagnets opening the valve controlled thereby when deenergized to render said servo inoperable when said circuit interrupting means is actuated.

References Cited in the file of this patent
UNITED STATES PATENTS

| | | |
|---|---|---|
| 1,248,130 | Kammerhoff | Nov. 27, 1917 |
| 1,813,719 | White | July 7, 1931 |
| 2,243,354 | Musser | May 27, 1941 |
| 2,454,659 | Leonard | Nov. 23, 1948 |
| 2,499,263 | Troy | Feb. 28, 1950 |
| 2,883,975 | Spetner | Apr. 28, 1959 |
| 2,908,264 | Kerr | Oct. 13, 1959 |